United States Patent [19]

Haruyama et al.

[11] Patent Number: 5,051,753
[45] Date of Patent: Sep. 24, 1991

[54] ARRAY ANTENNA SYSTEM WITH DIRECTION FINDING CAPABILITY

[75] Inventors: Tetsuo Haruyama; Shigeo Udagawa; Kuniaki Shiramatsu, all of Kanagawa, Japan

[73] Assignee: Mitsubishi Denki Kabushiki Kaisha, Tokyo, Japan

[21] Appl. No.: 423,892

[22] Filed: Oct. 19, 1989

[30] Foreign Application Priority Data

Oct. 20, 1988 [JP] Japan .................................. 63-264334

[51] Int. Cl.$^5$ ............................................. G01S 13/00
[52] U.S. Cl. ................................................... 342/158
[58] Field of Search ............... 342/154, 156, 157, 147, 342/153, 158

[56] References Cited

U.S. PATENT DOCUMENTS 3,380,053  4/1968  Connolly .
4,160,974  7/1979  Stavis .
4,336,540  6/1982  Goodwin et al. .

OTHER PUBLICATIONS

Numazaki et al., An Improved Thinning Method for Density Tapering of Planar Array Antennas, IEEE Transactions on Antennas and Propagation, vol. AP-35, No. 9, Sep. 1987.

Passive Direction Finding and Signal Location, Microwave Journal, Sep. 1982, pp. 59-76.

Find the Emitter Fast With Monopulse Methods, Microwaves, May 1978, pp. 42-53.

Primary Examiner—Theodore M. Blum
Attorney, Agent, or Firm—Wolf, Greenfield & Sacks

[57] ABSTRACT

An array antenna system having a predetermined electric current distribution on an antenna aperture to form a desired shape of antenna beam. Active antenna elements arranged on the aperture transmit a signal for electronically scanning a predetermined region to detect a target and receive a signal reflected by the target. Passive antenna elements are also arranged on the aperture. The antenna system further includes a direction finding section including reception antenna elements which receive an incident signal. The active, passive and reception antenna elements are positioned to allow a predetermine electric current distribution to be established on the antenna aperture.

14 Claims, 4 Drawing Sheets

ARRAY ANTENNA SYSTEM WITH DIRECTION FINDING CAPABILITY

BACKGROUND OF THE INVENTION

1. Field of the Invention

The present invention relates to array antenna systems having the capability to transmit and receive, for example, a radar signal, as well as to detect the direction of incident waves.

2. Description of the Prior Art

Electronically beam scanning array antenna systems are well known in this technical field. In such an array antenna system, antenna elements are arranged along a line or on a surface of a predetermined shape and are connected to the respective phase shifters. The direction of the beam formed by the array antenna system can be determined by controlling the amount of phase shift set to the respective phase shifters. On the other hand, the directivity of the array antenna system can, as is well known, be determined by the aperture distribution of the current. For example, the amplitude of the current excited in each antenna element is determined to produce, for example, the Taylor distribution or the Tchebycheff distribution on the aperture.

T. Numazaki et al. "An Improved Method for Density Tapering of Planar Array Antennas" IEEE TRANSACTIONS ON ANTENNAS AND PROPAGATION, Vol. AP-35, No. 9, September., 1987, p. 1066-1070 shows a phased array antenna system which can produce desired aperture distribution by a thinning method, i.e., by connecting some selected antenna elements to terminating devices such as resistors instead of to a transmitter or a receiver, thereby producing a predetermined density distribution of antenna elements required for establishing an aperture distribution equivalent to the Taylor distribution, the Tchebycheff distribution or the like. Accordingly, array antenna systems having different directivities can be obtained and used for various functions, such as for radars in searching or tracking airplanes.

However, such electronically scanning array antenna systems have the problem of not being able to accurately locate a target.

SUMMARY OF THE INVENTION

The present invention is directed solving such a problem. It is an object of the present invention to provide an array antenna system capable of establishing desired directional characteristics as well as detecting the directional approach of an incident wave detected by the array antenna system.

To achieve this object, an array antenna system according to the present invention includes a plurality of antenna elements arranged on an antenna aperture to establish a predetermined electric current distribution on the antenna aperture to form a desired shape of antenna beam. The array antenna system is capable of transmitting a signal for scanning a predetermined region by moving the antenna beam to detect a target and receiving a signal reflected by the target. The scanning of the region by the antenna beam is performed by a scanning means comprising active antenna elements arranged on the antenna aperture to transmit the signal for scanning the region and receive the signal from the target, and passive antenna elements arranged on the antenna aperture.

A direction finding means including reception antenna elements is provided for receiving the signal from the target to determine the directional approach of the signal received.

The respective positions of the active, passive and reception antenna elements are selected to allow the predetermined electric current distribution to be established on the antenna aperture, thereby forming the desired shape of the antenna beam.

The direction finding means operates to obtain a phase difference, amplitude difference or amplitude ratio between the signals received by the reception antenna elements for determining the approach direction of the signal received.

The invention will now be described, by way of example, with reference to the following description taken in conjunction with the accompanying drawings.

BRIEF DESCRIPTION OF THE DRAWINGS

In these figures, the same reference numerals designate similar elements or components.

DESCRIPTION OF THE PREFERRED EMBODIMENTS

Figure 1:
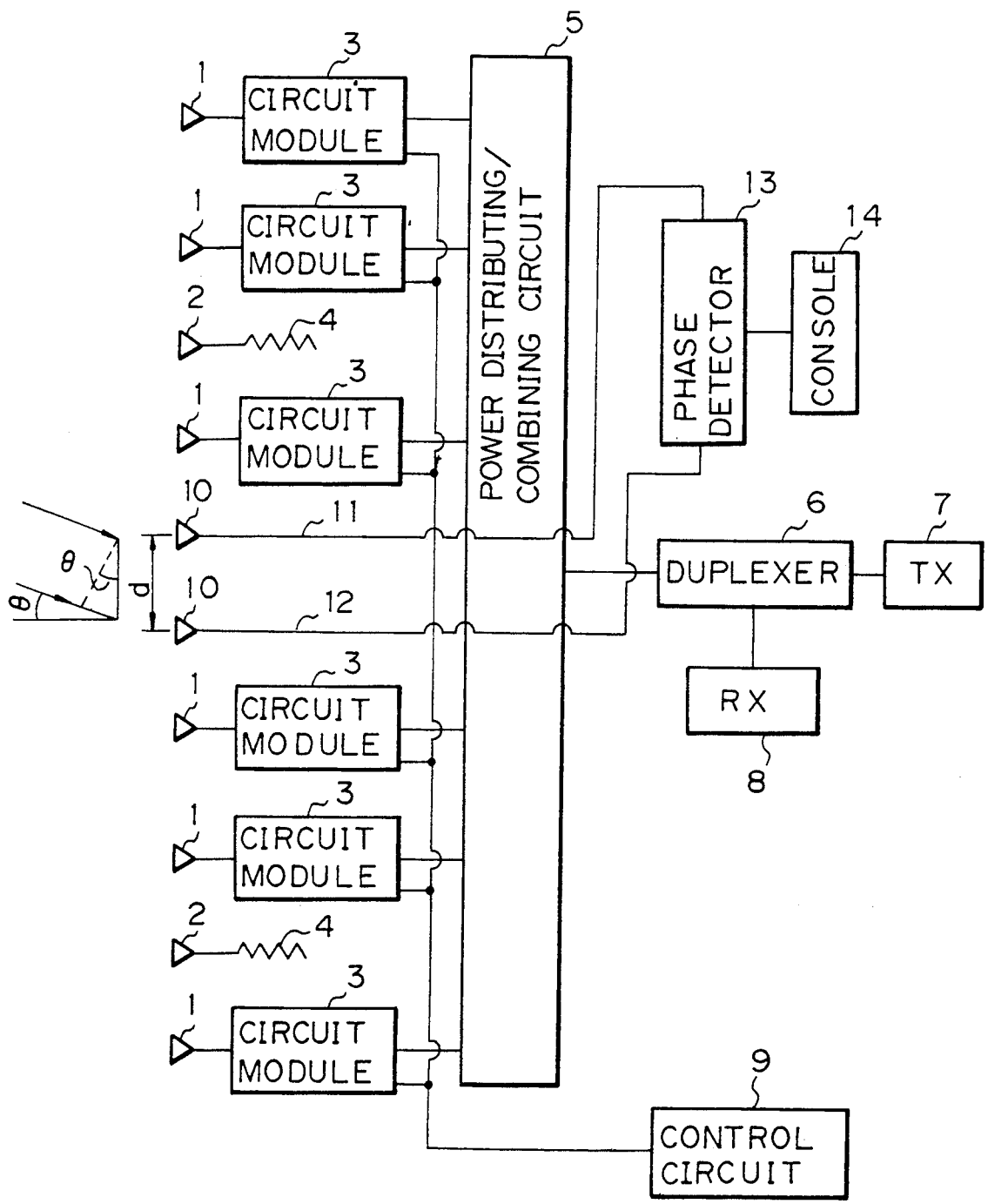
FIG. 1 is a block diagram showing the structure of a first embodiment of an array antenna system according to the present invention.

FIG. 1 is a block diagram showing the construction of a first embodiment of an array antenna system according to the present invention. In this embodiment, the array antenna system includes a first group of antenna elements 1 and a second group of antenna elements 2 which form a desired antenna aperture. An output of the first group of antenna elements is connected to a corresponding circuit module 3 and, in accordance with a thinning method, an output of the second group of antenna elements is connected to a terminating device 4, such as a terminating resistor. The number and the position in the antenna aperture of the second group of antenna elements are determined so as to form a desired aperture distribution, such as the Taylor distribution and the Tchebycheff distribution.

In order to transmit and receive a radar signal, the first group of antenna elements 1 are coupled to a transmitter and a receiver. More specifically, the outputs of the respective modules 3 are connected to input/output ports of a power distributing/combining circuit 5. A distributing/combining port of power distributing/combining circuit 5 is connected via duplexer 6 to a transmitter 7 and a receiver 8. A control circuit 9 is provided for controlling phase shifters within modules 3, as will be described in detail later, to cause a desired amount of phase shift to be set in each phase shifter, thereby forming the main beam in a desired direction.

Figure 2:
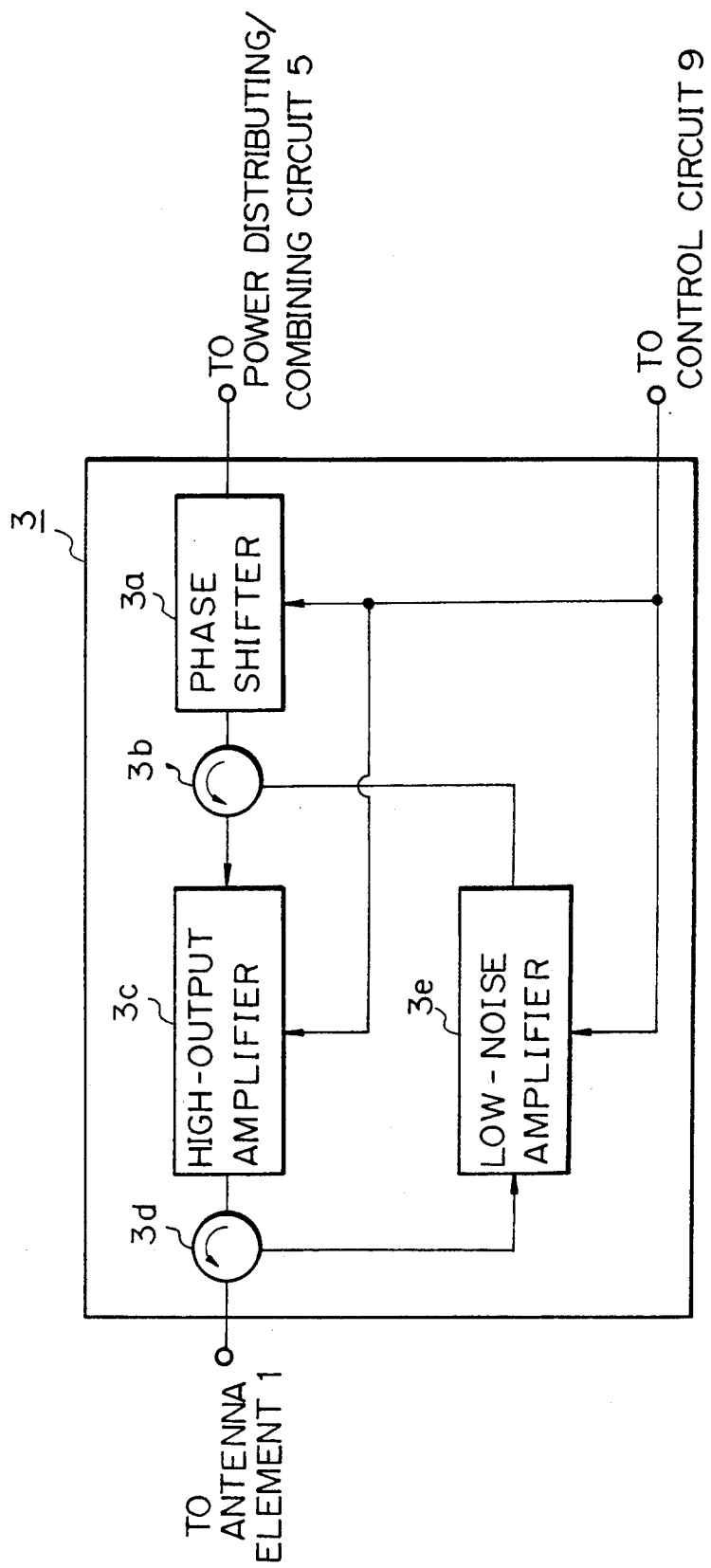
FIG. 2 is a block diagram of a circuit module used in the array antenna system in FIG. 1.

FIG. 2 schematically shows a circuit diagram of each module 3. Module 3 includes a bidirectional phase shifter 3a. One terminal of phase shifter 3a is connected to power distributing/combining circuit 5 and the other terminal of phase shifter 3a is connected to the first port of a first TR (Transmit/Receive) switch 3b. The second port of TR switch 3b is connected to an input of a high-output amplifier 3c, an output of which is in turn connected to the first port of a second TR switch 3d. The second port of second TR switch 3d is connected to antenna element 1 and the third port of second TR switch 3d is connected to an input of a low-noise amplifier 3e. An output of low-noise amplifier 3e is connected to the third port of first TR switch 3b. The first and second TR switches are of a circulator type in this example. Phase shifter 3a, high-output amplifier 3c and low-noise amplifier 3e are controlled by control circuit 9.

Returning to FIG. 1, the array antenna system further includes a third group of antenna elements 10 for receiving an incident wave. This third group of antenna elements 10 is used for determining the direction of an incident wave and, therefore, the elements are referred to as DF (Direction Finding) elements. To this end, the DF elements are positioned at a distance d and connected through signal cables 11 and 12 to a phase detector 13 which is in turn connected to a console panel 14 including a DF receiver.

The operation of the array antenna system will now be explained. In transmission, transmitter 7 supplies a transmission signal to power distributing/combining circuit 5 where the transmission signal is divided and distributed to respective phase shifters 3a in modules 3. Control circuit 9 has already set a desired amount of phase shift to each phase shifter 3a to allow the array antenna system to form the main beam in a desired direction. The amount of phase shift set to each phase shifter 3a can be changed to permit the array antenna system to perform the scanning of a predetermined area.

The transmission signal phase-shifted from each phase shifter 3a is supplied through first TR switch 3b to high-output amplifier 3c where the transmission signal is amplified to a high power level. The amplified signal from high-output amplifier 3c is fed through second TR switch 3d to antenna element 1 which radiates the fed signal to the air.

On reception, an incident signal such as a signal transmitted from the first group of antenna elements 1 and reflected by a target is received by the first group of antenna elements 1. The signal received from antenna element 1 is fed through second TR switch 3d, low-noise amplifier 3e, first TR switch 3b and phase shifter 3a to power distributing/combining circuit 5 where the received signals from the respective antenna elements are combined and fed to receiver 8.

At the same time, an incident signal is received by the third group of antenna elements or DF elements 10 which supply the received signals through signal cables 11 and 12 to phase detector 13. Assuming that a signal input to one terminal of phase detector 13 is expressed by the following equation:

$$V_1 = E_1 \sin \omega t \tag{1}$$

and that a signal input to the other terminal of phase detector 13 is expressed by the following equation:

$$V_2 = E_2 \sin(\omega t + \phi) \tag{2}$$

then, the signal output from phase detector 13 is expressed as follows:

$$V_{out} = K(E_1 \cdot E_2) \cos \phi \tag{3}$$

As can be seen from equation (3), output signal $V_{out}$ is a function of phase difference $\phi$, the difference in phase between the signals received by DF elements 10. Output signal $V_{out}$ is read and converted to phase difference $\phi$ in console panel 14.

The relationship between phase difference $\phi$ and direction $\theta$ of the incident signal is expressed by the following equation:

$$\theta = \sin^{-1}(1\lambda \cdot \phi / 2\pi d) \tag{4}$$

where $\lambda$ is the wavelength of an operating frequency. According to equation (4), the direction of the incident signal can be calculated and displayed on console panel 14.

In this embodiment, the DF elements are comprised of two antenna elements. In order to reduce ambiguity, however, it may be possible to add to the direction finding system antenna elements and a circuit for deciding whether an electrical wave is incident to the DF elements in a direction where ambiguity occurs.

The first, second and third groups of antenna elements serve in combination to establish a desired electric current distribution on the antenna aperture to form a desired shape of antenna beam.

Figure 3:
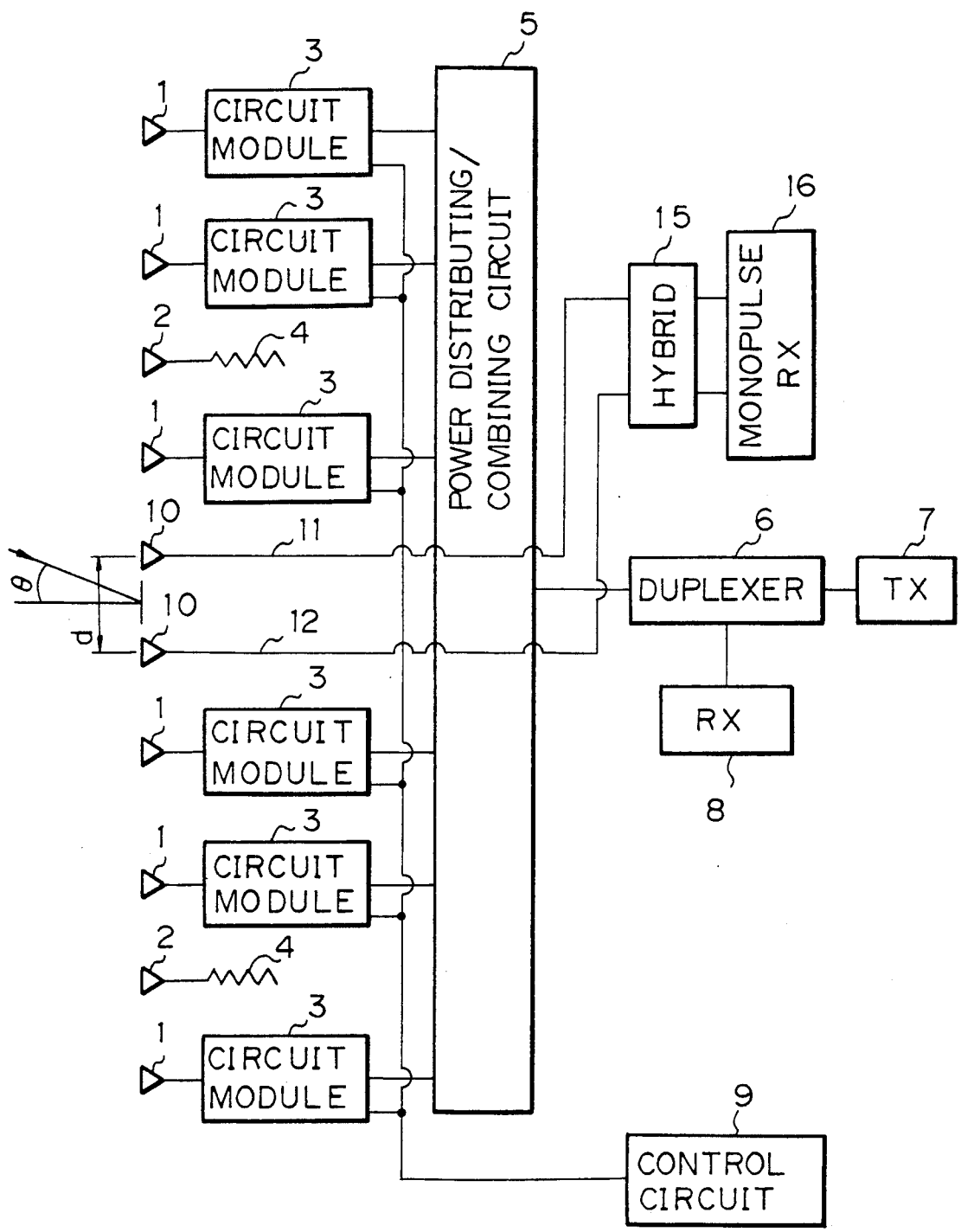
FIG. 3 is a block diagram showing the structure of a second embodiment of an array antenna system according to the present invention.

FIG. 3 is a block diagram showing the construction of the second embodiment of an array antenna system according to the present invention. The second embodiment differs from the first embodiment in that a hybrid circuit 15 and a monopulse receiver 16 are used in place of phase detector 13 and console 14.

Signals received by, and outputted from, DF elements 10 and 10 are fed through signal cables 11 and 12 and hybrid circuit 15 to monopulse receiver 16. Monopulse receiver 16 derives a sum signal "$\Sigma(\theta)$" corresponding to the sum of the signals from DF elements 10 and 10 and a difference signal "$-j\Delta(\theta)$" corresponding to the difference between the signals from DF elements 10 and 10, and outputs a signal indicating the ratio $f(\theta)$ of the difference signal to the sum signal. This output signal $f(\theta)$ corresponds to what is called a "discrimination curve" and is expressed as follows:

$$f(\theta) = \frac{-j\Delta(\theta)}{\Sigma(\theta)} = \tan\left(\frac{\pi d}{\lambda} \sin \theta\right) \tag{5}$$

Accordingly, the directional approach of the wave received by the array antenna system can be identified by calculating a value of $f(\theta)$, that is, the ratio between the sum signal $\Sigma(\theta)$ and the difference signal $-j\Delta(\theta)$.

Figure 4:
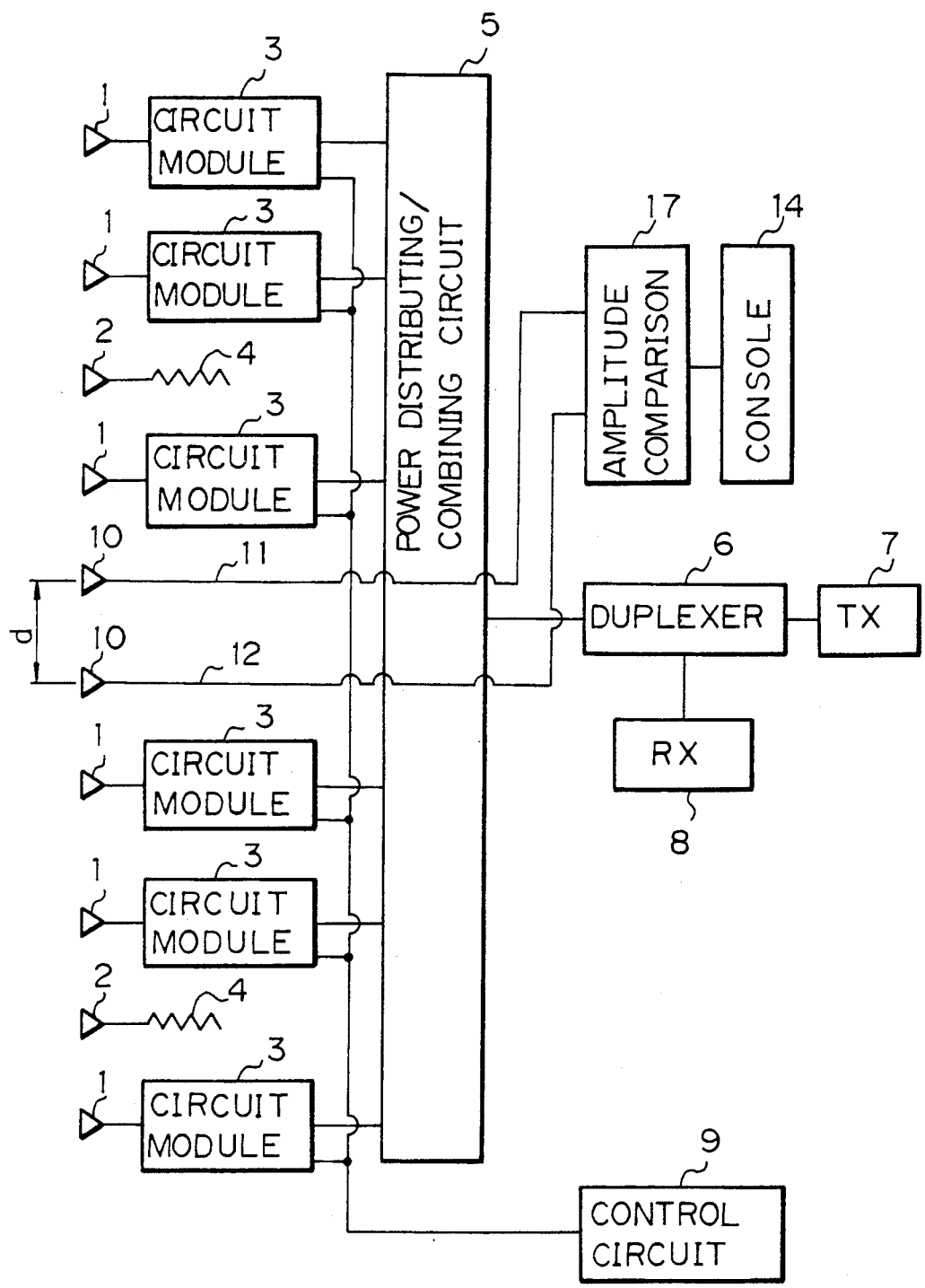
FIG. 4 is a block diagram showing the structure of a third embodiment of an array antenna system according to the present invention.

FIG. 4 is a block diagram showing the construction of a third embodiment of an array antenna system according to the present invention. This embodiment differs from the first embodiment in that an amplitude comparison circuit 17 is employed in place of phase detector 13. Amplitude comparison circuit 17 is supplied with the signals received by DF elements 10 and 10, and calculates the ratio C of the amplitudes between these two signals. Ratio C is expressed in the following equation:

$$C = 48.16(S/2)/(\theta_{BW})^2 \tag{6}$$

where $\theta_{BW}$ is the width of a beam formed by each of DF elements 10 and 10 and S is a squint angle indicating the angle between the center lines of two beams. Accordingly, a calculation of the ratio of the amplitudes of the signals received by DF elements 10 and 10 gives the directional approach of the wave incident to the array antenna system.

As will be understood from the description given heretofore, two of the thinned antenna elements are replaced with the third group of antenna elements 10 and 10 which are coupled to phase detector 13, monopulse receiver 16 or amplitude comparison circuit 17 for deciding the directional approach of the signal received, and the first, second and third groups of antenna elements are arranged on the antenna aperture to establish a predetermined distribution of electric current on the antenna aperture. This ensures the array antenna system has the capability to detect the direction of an approaching incident wave as well as being able to electronically scan a desired region by an antenna beam formed by distribution of an electric current on the antenna aperture.

The invention has been described in detail with particular reference to certain preferred embodiments thereof, but it will be understood that variations and modifications can be effected within the spirit and scope of the invention.

What is claimed is:

1. An array antenna system for scanning a predetermined region by an antenna beam, comprising:
    a transmitter;
    a receiver;
    a first plurality of excited antenna elements;
    phase shift means connecting said excited antenna elements to said transmitter and said receiver;
    a second plurality of antenna elements each having terminating means coupled to the output thereof;
    a third plurality of antenna elements capable of receiving an incident electric wave; and
    means, connected to each of said third plurality of antenna elements, for determining the directional approach of the incident electric wave,
    wherein said excited antenna elements, said second plurality of antenna elements, and said third plurality of antenna elements are selected to produce a desired density tapering of said antenna elements on an aperture of the array antenna system, thereby establishing a desired distribution of electric current on the aperture.

2. An antenna system as defined in claim 1 wherein said direction determining means comprises monopulse receiver means.

3. An antenna system as defined in claim 1 wherein said direction determining means comprises amplitude comparator means for comparing the amplitudes of the signals respectively received by the third plurality of antenna elements.

4. An antenna system as defined in claim 1 wherein said direction determining means comprises phase detector means for detecting phase difference among signals produced by said third plurality of antenna elements.

5. An array antenna system for locating a target, comprising:
    scanning means for allowing the antenna beam to be moved in a predetermined region to achieve a scan for detecting the target, said scanning means including active antenna elements arranged on an antenna aperture to transmit the signal for scanning the region and receive the signal reflected by the target in said region, and other antenna elements arranged on the antenna aperture and each having terminating means coupled to the output thereof; and
    direction finding means including reception antenna elements operative to receive the signal reflected by the target for determining the directional approach of the signal received;
    wherein the respective positions of said active and other antenna elements and said reception antenna elements are selected to enable a predetermined distribution of electric current to be established on the antenna aperture, thereby forming a desired shape of the antenna beam.

6. An antenna system as defined in claim 5 wherein said direction finding means further includes means for obtaining a phase difference between the signals received by said reception antenna elements to determine the directional approach of the signals received.

7. An antenna system as defined in claim 5 wherein said direction finding means further includes means for obtaining amplitude difference between the signals received by said reception antenna elements to determine the directional approach of the signals received.

8. An antenna system as defined in claim 5 wherein said direction finding means further includes means for obtaining an amplitude ratio between the signals received by said reception antenna elements to determine the directional approach of the signals received.

9. An array antenna system having a plurality of antenna elements arranged on an antenna aperture to establish a predetermined distribution of an electric current on the antenna aperture to form a desired shape of antenna beam, and capable of transmitting a signal for scanning a predetermined region and receiving a signal reflected by the target, thereby detecting the target, comprising:
    a scanning antenna system for allowing the antenna beam to be moved in a predetermined region for achieving an electronic scan to detect the target, said scanning antenna system including a first group of antenna elements arranged on the antenna aperture to transmit the signal for electronically scanning the region and receive the signal reflected by the target, a second group of antenna elements arranged on the antenna aperture and terminating means connected to the outputs of said second group of antenna elements; and
    a direction finding means including a third group of antenna elements operative to receive an incident signal and a phase detector means responsive to the received signal and able to determine the directional approach of the signals received;
    wherein the respective positions of said antenna elements in said first, second and third groups are selected to allow the predetermined electric current distribution to be established on the antenna aperture, thereby forming the desired shape of the antenna beam.

10. Antenna system as defined in claim 9 wherein said direction finding means operates to obtain a phase difference between the signals received by the respective antenna elements in said third group so as to determine the directional approach of the signals recieved.

11. An array antenna system having a plurality of antenna elements arranged on an antenna aperture to establish a predetermined distribution of an electrical current on the antenna aperture to form a desired shape of antenna beam, and capable of transmitting a signal for scanning a predetermined region and receiving a signal reflected by the target, thereby detecting the target, comprising:
- a scanning antenna system for allowing the antenna beam to be moved in the predetermined region for achieving the electronic scan to detect the target, said scanning antenna system including a first group of antenna elements arranged on the antenna aperture to transmit the signal for electronically scanning the region and receive the signal reflected by the target, a second group of antenna elements arranged on the antenna aperture and terminating means connected to the outputs of said second group of antenna elements; and
- a direction finding means including a third group of antenna elements operative to receive an incident wave and a monopulse receiver means responsive to the received signal to determine the direction of the received signal;
- wherein the respective positions of said antenna elements in said first, second and third groups are selected to allow the predetermined electric current distribution to be established on the antenna aperture, thereby forming the desired shape of the antenna beam.

12. Antenna system as defined in claim 11 wherein said direction finding means operates to obtain an amplitude ratio between the signals received by the respective antenna elements in said third group to determine the direction of the received signals.

13. An array antenna system having a plurality of antenna elements arranged on an antenna aperture to establish a predetermined distribution of an electrical current on the antenna aperture to form a desired shape of antenna beam, and capable of transmitting a signal for scanning a predetermined region and receiving a signal reflected by the target, thereby detecting the target, comprising:
- a scanning antenna system for allowing the antenna beam to be moved in a predetermined region for achieving an electronic scan to detect the target, said scanning antenna system including a first group of antenna elements arranged on the antenna aperture to transmit the signal for electronically scanning the region and receive the signal reflected by the target, a second group of antenna elements arranged on the antenna aperture and terminating means connected to the outputs of said second group of antenna elements; and
- a direction finding means including a third group of antenna elements operative to receive an incident signal and an amplitude comparator means responsive to the received signal to determine the direction of the received signal;
- wherein the respective positions of said antenna elements in said first, second and third groups are selected to allow the predetermined electric current distribution to be established on the antenna aperture, thereby forming the desired shape of the antenna beam.

14. Antenna system as defined in claim 13 wherein said direction finding means operates to obtain an amplitude difference between the signals received by the respective antenna elements in said third group to determine the direction of the received signals.

* * * * *